United States Patent
Kikuchi

(10) Patent No.: US 9,411,713 B2
(45) Date of Patent: Aug. 9, 2016

(54) METHOD FOR SUPPORTING PRODUCT DESIGN AND PRODUCT DESIGN SUPPORT APPARATUS

(71) Applicant: FUJITSU LIMITED, Kawasaki-shi, Kanagawa (JP)

(72) Inventor: Hideharu Kikuchi, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/579,188

(22) Filed: Dec. 22, 2014

(65) Prior Publication Data

US 2015/0227347 A1     Aug. 13, 2015

(30) Foreign Application Priority Data

Feb. 10, 2014   (JP) ................ 2014-023881

(51) Int. Cl.
| | | |
|---|---|---|
| *G06F 9/44* | (2006.01) | |
| *G06F 11/36* | (2006.01) | |
| *G06Q 10/06* | (2012.01) | |

(52) U.S. Cl.
CPC .............. *G06F 11/3692* (2013.01); *G06F 8/10* (2013.01); *G06F 11/3676* (2013.01); *G06Q 10/06* (2013.01)

(58) Field of Classification Search
CPC ............ G06F 11/3692; G06F 11/3676; G06F 11/3688; G06F 11/3664; G06F 11/3684; G06F 8/10; G06F 8/73; G06F 8/71; G06F 8/75

USPC ................................... 717/123, 124
See application file for complete search history.

(56) References Cited

U.S. PATENT DOCUMENTS

| | | | | |
|---|---|---|---|---|
| 6,546,506 | B1* | 4/2003 | Lewis ................ | G06Q 10/06 714/38.1 |
| 2007/0168924 | A1* | 7/2007 | Kirby, Jr. .......... | G06F 8/10 717/104 |
| 2008/0263505 | A1* | 10/2008 | StClair .............. | G06F 8/10 717/101 |
| 2008/0282124 | A1* | 11/2008 | Esposito ........... | G06F 11/3672 714/736 |
| 2011/0088011 | A1* | 4/2011 | Ouali ................ | G06F 8/10 717/105 |
| 2013/0139130 | A1* | 5/2013 | Anjan ............... | G06F 11/3672 717/131 |
| 2014/0096104 | A1* | 4/2014 | Novak .............. | G06Q 10/0631 717/101 |

FOREIGN PATENT DOCUMENTS

| | | |
|---|---|---|
| JP | 2001-337846 | 12/2001 |
| JP | 2007-241347 | 9/2007 |
| JP | 2013/15958 | 1/2013 |

* cited by examiner

*Primary Examiner* — Anna Deng
(74) *Attorney, Agent, or Firm* — Staas & Halsey LLP

(57) ABSTRACT

A computer refers to a first document, second documents related to the first document, test documents related to the respective second documents, and test results associated with the respective test documents. The first document defines a first requirement. The second documents define functions of the first requirement. The computer calculates, on basis of the test results and a total number of test items included in all of the test documents, a degree of difficulty in realizing the first requirement.

9 Claims, 10 Drawing Sheets

FIG. 6

| | FUNCTION | NUMBER OF TEST ITEMS | NUMBER OF FAILURES | DEGREE OF DIFFICULTY | NECESSITY |
|---|---|---|---|---|---|
| REQUIREMENT_A | FUNCTION_1 | 20 | 2 | 0.146 (0.971) | 0.150 |
| | FUNCTION_3 | 35 | 10 | | |
| | FUNCTION_5 | 48 | 3 | | |
| REQUIREMENT_B | FUNCTION_1 | 20 | 2 | 0.083 (1.667) | 0.050 |
| | FUNCTION_2 | 40 | 4 | | |
| | FUNCTION_5 | 48 | 3 | | |

FIG. 10

| | FUNCTION | AMOUNT OF DEVELOPMENT (Kstep) | NUMBER OF TEST ITEMS | NUMBER OF FAILURES | DEGREE OF DIFFICULTY | NECESSITY |
|---|---|---|---|---|---|---|
| REQUIREMENT_A | FUNCTION_1 | 1 | 20 | 2 | 0.145 (0.967) | 0.150 |
| | FUNCTION_3 | 1.5 | 35 | 10 | | |
| | FUNCTION_5 | 2 | 48 | 3 | | |
| REQUIREMENT_B | FUNCTION_1 | 1 | 20 | 2 | 0.084 (1.680) | 0.050 |
| | FUNCTION_2 | 1.8 | 40 | 4 | | |
| | FUNCTION_5 | 2 | 48 | 3 | | |

METHOD FOR SUPPORTING PRODUCT DESIGN AND PRODUCT DESIGN SUPPORT APPARATUS

CROSS-REFERENCE TO RELATED APPLICATION

This application is based upon and claims the benefit of priority from the Japanese Patent Application No. 2014-023881 filed on Feb. 10, 2014, the entire contents of which are incorporated herein by reference.

FIELD

The embodiments discussed herein are related to a method for supporting product design and a product design support apparatus.

BACKGROUND

When developing a product controlled by software, various tests are performed. As an example of such tests is a test for the software only. There is also a system test that tests the combination of the software and an electronic circuit, a product test intended for a product on which a component to be controlled is mounted, and the like.

In the related art, a technique is proposed in which results of review on design documents and results of test on a program code are stored in association with each other. Another technique is also proposed in which a total number of test items of each business are allocated in accordance with preset weights to calculate a target value for each subsystem. Furthermore, a method for evaluating the artifact of each process, which is created in the course of software development, is proposed in which a state of a dependent relation between the artifacts of a plurality of processes in the course of software development is evaluated.

Related techniques are disclosed in, for example, Japanese Laid-open Patent Publication No. 2007-241347, Japanese Laid-open Patent Publication No. 2001-337846, and Japanese Laid-open Patent Publication No. 2013-015958.

When developing a product controlled by software, requirement definition is made in which the conditions to be met by the developed product are defined. The requirement definition is described in a document such as a requirement definition document. The requirement definition is an abstract definition and various functions are defined by detailing or embodying the requirements. Each function is described in a document such as a design document.

Each of requirements and functions has a degree of difficulty to be realized. For example, if conditions specified by the requirement or the function are complicated, the degree of difficulty is increased. At a level of the function in which the requirement is embodied or detailed, it is not difficult to quantitatively derive the degree of difficulty in realizing the function on the basis of results of a test performed on the function.

On the other hand, as described above, the conditions to be met by the developed product are abstractly defined in the requirement definition, and it is difficult to quantitatively derive a degree of difficulty in realizing the requirement. It is preferable that a designer may quantitatively evaluate the degree of difficulty in realizing the requirement when designing the product to be developed.

SUMMARY

According to an aspect of the present invention, provided is a method for supporting product design. In the method, a computer refers to a first document, second documents related to the first document, test documents related to the respective second documents, and test results associated with the respective test documents. The first document defines a first requirement. The second documents define functions of the first requirement. The computer calculates, on basis of the test results and a total number of test items included in all of the test documents, a degree of difficulty in realizing the first requirement.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an example of a table illustrating a degree of difficulty of each requirement according to an embodiment;

FIG. 10 is an example of a table illustrating a degree of difficulty of each requirement according to an embodiment.

DESCRIPTION OF EMBODIMENTS

Hereinafter, embodiments will be described with reference to the drawings.

First Embodiment

Figure 1:
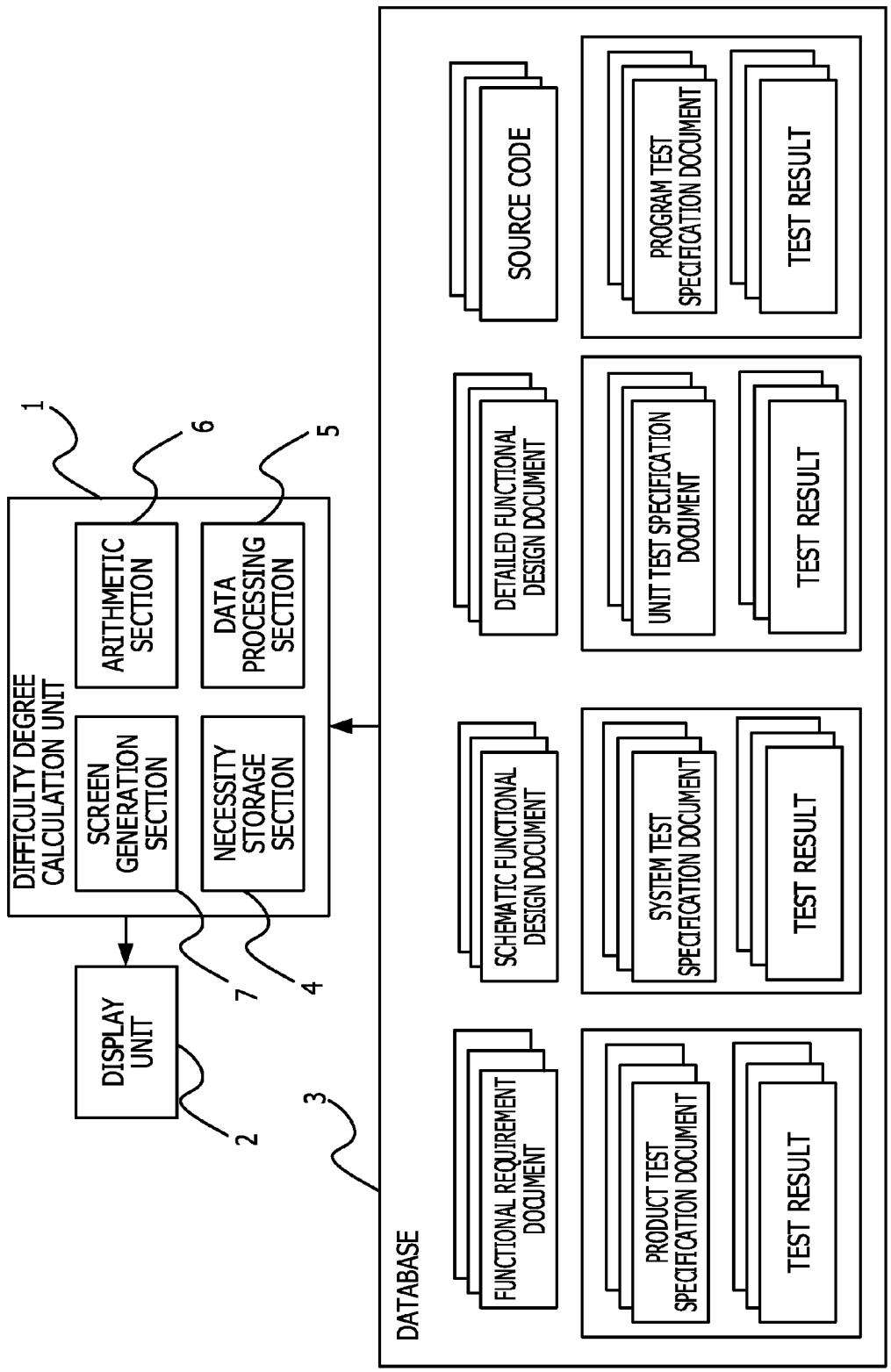
FIG. 1 is a diagram illustrating an example of a product design support apparatus.

FIG. 1 illustrates an example of a product design support apparatus according to a first embodiment. In FIG. 1, a difficulty degree calculation unit 1 is connected to a display unit 2, and a database 3. The display unit 2 includes a screen for displaying the output of the difficulty degree calculation unit 1. For example, the display unit 2 is a display device. The database 3 is one example of a storage section.

The database 3 stores various documents as electronic data. Hereinafter, the electronic data of the documents are referred to as document data. The database 3 stores a functional requirement document, a schematic functional design document, a detailed functional design document, and a source code. The database 3 stores a product test specification document, a system test specification document, a unit test specification document, and a program test specification document.

The product test specification document, the system test specification document, the unit test specification document, and the program test specification document are stored in the database 3 in association with respective test results. A test result is a result of tests based on a corresponding test specification document. The test specification documents are an example of test documents.

In FIG. 1, each piece of document data is stored in one database 3, but each piece of document data may be stored in a different database. Furthermore, the test specification document and the associated test result may be stored in the same database and other pieces of document data may be stored in different databases.

According to FIG. 1, plural pieces of document data are stored in the database 3 for functional requirement documents. If the requirement is one, one piece of document data may be stored in the database 3 for the functional requirement document. The same applies to other pieces of document data and one or more pieces of document data may be stored in the database 3 for each type of document data.

The difficulty degree calculation unit 1 includes a necessity storage section 4, a data processing section 5, an arithmetic section 6, and a screen generation section 7. The necessity storage section 4 stores necessities of the respective requirements. The requirements have respective necessities and the necessities are different depending on the requirements.

For example, for the requirements mandatory to the product, the necessity is very high. The necessity of the requirements for improving commodity power of the product is lower than that of the requirements for safety, but the still relatively high. The necessity of the requirements of a convenient function of the product is low. The necessity storage section 4 stores the necessity for each requirement as a numerical value.

The data processing section 5 acquires each piece of document data stored in the database 3 to perform various processes. The arithmetic section 6 performs various calculations to obtain a degree of difficulty of a requirement, on the basis of information acquired by the data processing section 5. The screen generation section 7 generates screen data including the degree of difficulty of the requirement to output the generated screen data to the display unit 2. The display unit 2 displays the input screen data.

Figure 2:
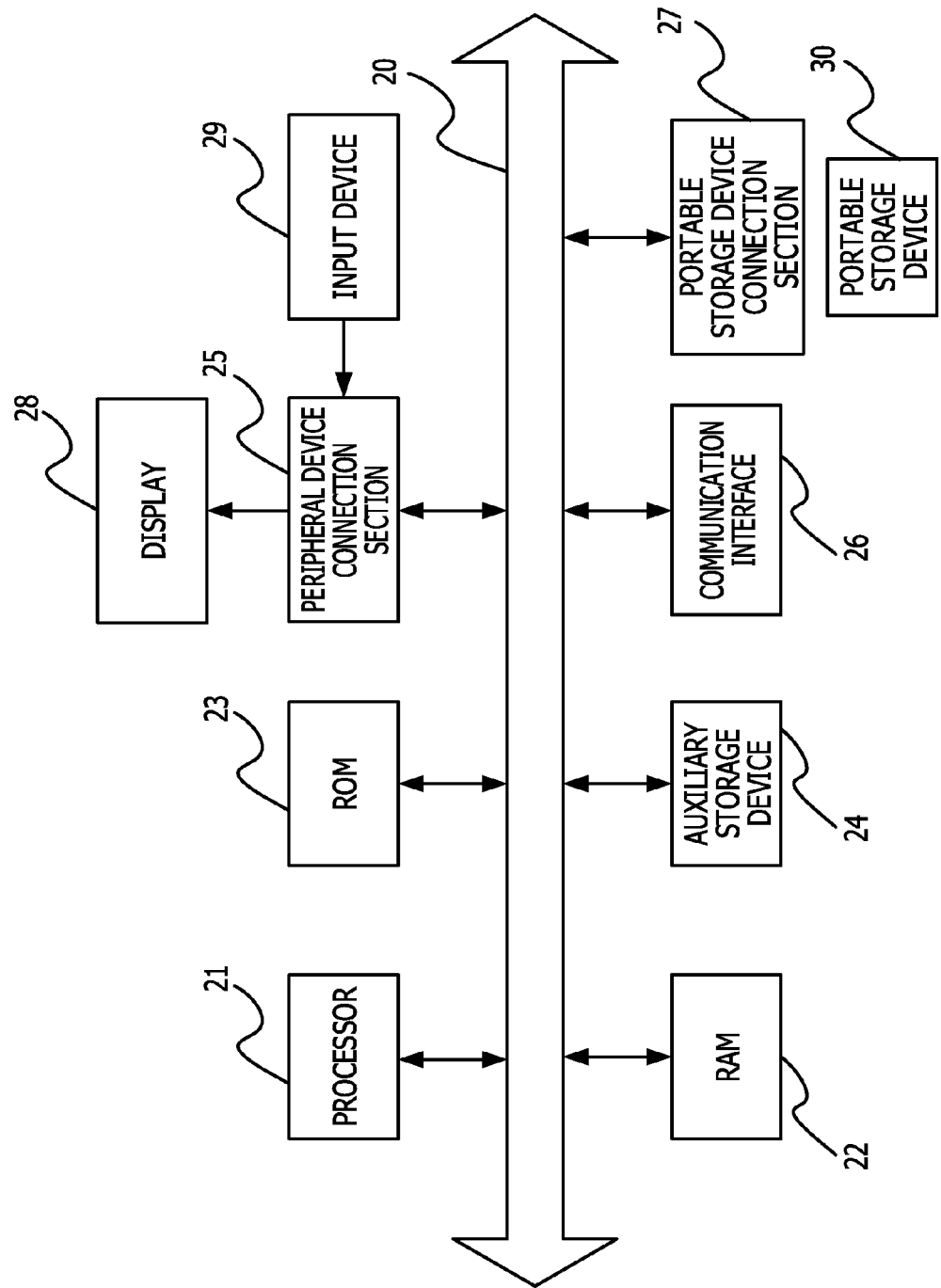
FIG. 2 is a diagram illustrating an example of a hardware configuration of a product design support apparatus.

Next, an example of a hardware configuration of the difficulty degree calculation unit 1 will be described. As illustrated in FIG. 2, the difficulty degree calculation unit 1 includes a processor 21, a random access memory (RAM) 22, a read-only memory (ROM) 23, an auxiliary storage device 24, a peripheral device connection section 25, a communication interface 26, and a portable storage device connection section 27. These components are connected with one another via a bus 20.

The processor 21 is an arbitrary processing circuit such as a central processing unit (CPU). The processor 21 executes a program loaded in the RAM 22. The ROM 23 is a non-volatile storage device storing a program to be loaded in the RAM 22.

The auxiliary storage device 24 is a storage device storing various types of information and, for example, a hard disk drive, a semiconductor memory, or the like may be used as the auxiliary storage device 24. The database 3 described above may be stored in the auxiliary storage device 24. The peripheral device connection section 25 connects a display device 28 and an input device 29.

The communication interface 26 is an interface for communicating with the outside. For example, the database 3 may be stored in an external storage device that is connected via a local area network (LAN). In this case, the processor 21 may refer to the database 3 through the communication interface 26.

The portable storage device connection section 27 is provided so as to connect with a portable storage device 30. As the portable storage device 30, a portable memory, an optical disk such as a compact disk (CD) and a digital versatile disk (DVD), or the like may be applied. The program for performing the process of the present embodiment may be stored in a computer-readable recording medium. In this case, the portable storage device 30 may be applied to the recording medium.

Each of the RAM 22, the ROM 23, and the auxiliary storage device 24 is an example of a tangible computer-readable recording medium. These tangible recording media are not transitory media such as signal carrier waves.

The data processing section 5, the arithmetic section 6, and the screen generation section 7 of the difficulty degree calculation unit 1 illustrated in FIG. 1 may be realized, for example, by executing an application program by the processor 21. The necessity storage section 4 may be realized by the RAM 22.

Figure 3:
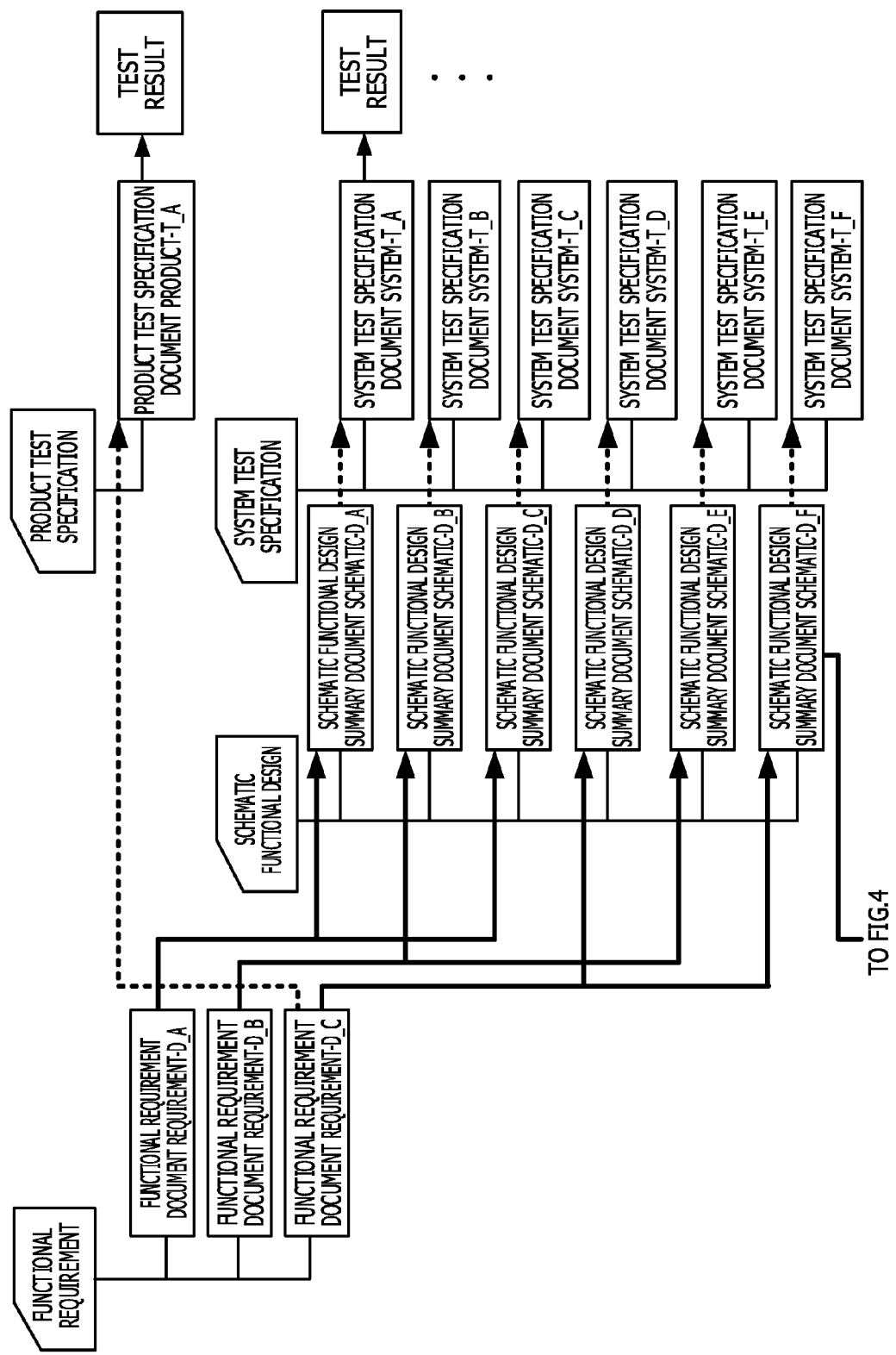
FIG. 3 is a diagram illustrating an example of relations of documents.
Figure 4:
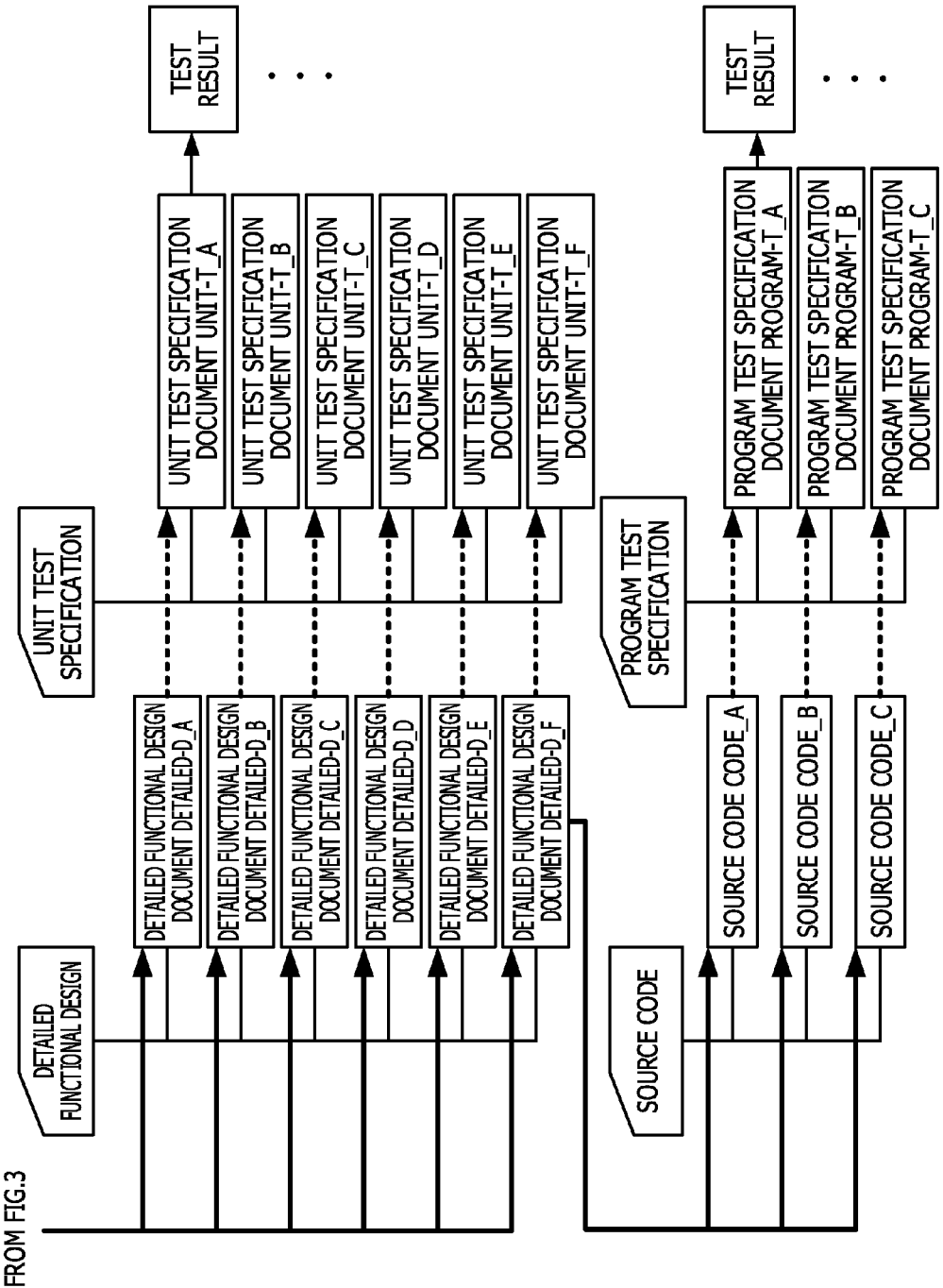
FIG. 4 is a diagram illustrating an example of relations of documents.

FIGS. 3 and 4 illustrate an example of relations among the documents. For example, the functional requirements include requirements regarding functions, from among the requirements in which the conditions to be met by a product controlled by software are defined. The functional requirements may simply be referred to as "requirements".

According to the present embodiment, the requirements are defined in the functional requirement document. The functional requirement document is an example of a first document. In FIG. 3, a functional requirement document REQUIREMENT-D_A, a functional requirement document REQUIREMENT-D_B, and a functional requirement document REQUIREMENT-D_C are illustrated, but the number of the functional requirement documents is not limited to three.

As illustrated in FIG. 1, the database 3 stores the product test specification document, the system test specification document, the unit test specification document, and the program test specification document. Each test specification document is associated with a corresponding test result.

A test result is a result of tests according to a corresponding test specification document. The test specification document includes one or more test items. In the present embodiment, the test specification document is assumed to include a plurality of test items. The test result is a result of tests according to respective test items and includes the numbers of normalcies and failures (which may be defects). The test specification document may also include information regarding test contents, an execution environment of the test, or the like.

In FIG. 3, only one product test specification document is illustrated, but a plurality of product test specification documents may be included. The product test specification document is a specification document regarding tests when software is loaded in an actual product. The test result is associated with a product test specification document PRODUCT-T_A.

In one example of FIG. 3, six schematic functional design documents SCHEMATIC-D_A to SCHEMATIC-D_F are illustrated. The schematic functional design documents are design documents summarizing the functions defined in the functional requirement document. A schematic functional design document is an example of the first design document. The number of schematic functional design documents is not limited to six. System test specification documents SYSTEM-T_A to SYSTEM-T_F correspond to schematic functional design documents SCHEMATIC-D_A to SCHEMATIC-D_F, respectively.

As described above, a schematic functional design document is a design document summarizing the functions defined in the functional requirement document. The system test specification documents related to the schematic functional design documents specify tests of an entire system of the product. The system test specification documents SYSTEM-T_A to SYSTEM-T_F are associated with respective test results. The number of test items included in a test specification document may be one and, in this case, the number of normalcies or failures is also one.

In FIGS. 3 and 4, a relation between documents is represented by a solid arrow or a dashed arrow. The solid arrow represents a first relation. The first relation may be referred to as a refinement or substantiation relation. Abstract conditions to be met by the developed product are described in the functional requirement document. Therefore, a schematic functional design document to which a first relation is set in a functional requirement document is a design document which refines or substantiates the functional requirement document.

In FIG. 3, a first relation is set between the functional requirement document REQUIREMENT-D_A and the schematic functional design documents SCHEMATIC-D_A and SCHEMATIC-D_C. A first relation is set between the functional requirement document REQUIREMENT-D_B and the schematic functional design documents SCHEMATIC-D_B and SCHEMATIC-D_E. Furthermore, a first relation is set between the functional requirement document REQUIREMENT-D_C and the schematic functional design documents SCHEMATIC-D_D and SCHEMATIC-D_F.

In FIG. 3, the dashed arrow represents a second relation. The second relation may be referred to as a verification relation. A second relation is a relation that is set to the test specification document. A second relation represents a relation between a test specification document and a second document to be tested in accordance with the test specification document.

In FIG. 3, second relations are set between the schematic functional design documents SCHEMATIC-D_A to SCHEMATIC-D_F and the system test specification documents SYSTEM-T_A to SYSTEM-T_F, respectively. A second relation is also set between the functional requirement document REQUIREMENT-D_C and the product test specification document PRODUCT-T-D_A.

The first relations and the second relations are set between the documents in advance. The first relations and the second relations may be set by an arbitrary method. For example, if a functional requirement document and a schematic functional design document have a common file name, a first relation may be set between the two documents. If there is a commonality between data included in a functional requirement document and the data included in a schematic functional design document, a first relation may be set between the two documents.

As described above, the first relations and the second relations may be set in advance. The first relations and the second relations set in advance may be stored in, for example, the RAM 22, the auxiliary storage device 24, or the like.

As illustrated in FIGS. 3 and 4, a first relation is set between the schematic functional design document SCHEMATIC-D_F and the detailed functional design documents DETAILED-D_A to DETAILED-D_F. A schematic functional design document according to the present embodiment is a summary of a design document of an entire system of the product. A second relation is set between a schematic functional design document and a system test specification document.

A detailed functional design document according to the present embodiment is a design document which refines or substantiates a schematic functional design document. A detailed functional design document is an example of a second design document. A detailed functional design document defines conditions for an individual component, module, or the like. In FIGS. 3 and 4, the detailed functional design documents DETAILED-D_A to DETAILED-D_F are design documents which refine or substantiate the schematic functional design document SCHEMATIC-D_F.

The schematic functional design document SCHEMATIC-D_F may be refined or substantiated in a plurality of design documents. As an example, it is assumed that the schematic functional design document SCHEMATIC-D_F is refined or substantiated in the detailed functional design documents DETAILED-D_A to DETAILED-D_F. Therefore, a first relation is set between the schematic functional design document SCHEMATIC-D_F and the detailed functional design documents DETAILED-D_A to DETAILED-D_F.

As described above, a first relation may be set between one schematic functional design document and a plurality of detailed functional design documents. A first relation may be set between one schematic functional design document and one detailed functional design document. First relations may also be set between the schematic functional design documents SCHEMATIC-D_A to SCHEMATIC-D_E and one or more detailed functional design documents.

A second relation is set between the detailed functional design documents DETAILED-D_A to DETAILED-D_F and unit test specification documents UNIT-T_A to UNIT-T_F. A unit test specification document is a specification document in which the contents of the tests on an individual component, module, or the like (hereinafter, referred to as a unit) are defined. The unit test specification documents UNIT-T_A to UNIT-T_F are associated with respective test results of the tests performed in accordance with the respective unit test specification documents.

As illustrated in FIG. 4, a first relation is set between the detailed functional design document DETAILED-D_F and source codes CODE_A to CODE_C. The source code according to the present embodiment is one in which the function defined in the detailed functional design document is refined or substantiated to a source code level. A second relation is set between the source code and the program test specification document.

The detailed functional design document DETAILED-D_F may be refined or substantiated in a plurality of source codes. As an example, it is assumed that the detailed functional design document DETAILED-D_F is refined or substantiated in the source codes CODE_A to CODE_C. Therefore, a first relation is set between the detailed functional design document DETAILED-D_F and the source codes CODE_A to CODE_C.

As described above, a first relation may be set between one detailed functional design document and a plurality of source codes. A first relation may be set between one detailed functional design document and one source code. Furthermore, first relations may be set between the detailed functional design documents DETAILED-D_A to DETAILED-D_E and one or more source codes.

Second relations are set between the source codes CODE_A to CODE_C and program test specification documents PROGRAM-T_A to PROGRAM-T_C. A program test specification document is a specification document in which contents of the tests on a source code are defined. The program test specification documents PROGRAM-T_A to PROGRAM-T_C is associated with respective test results of the tests performed in accordance with the respective program test specification documents. For example, a test result includes the number of successes and failures.

A schematic functional design document, a detailed functional design document, and a source code are examples of a second document. A second document is a document which defines functions of the requirement defined in the first document. A second document is not limited to the schematic functional design document, the detailed functional design document, or the source code, but any document as long as the document defines functions of the requirement.

Next, a process of the present embodiment will be described with reference to FIG. 5 as an example. First, the data processing section 5 acquires first documents for the requirement, for which calculation of the degree of difficulty is performed, from the database 3 and sets the acquired first documents in a list L1 (S1). According to the present embodiment, since a first document is a functional requirement document, the acquired functional requirement documents are set in the list L1.

A plurality of functional requirement documents are stored in the database 3. The data processing section 5 acquires a part or all of targeted functional requirement documents from the plurality of functional requirement documents stored in the database 3. The data processing section 5 sets the acquired functional requirement documents in the list L1. The list L1 may be stored in the RAM 22. In this case, the data processing section 5 stores the acquired functional requirement documents in the RAM 22.

Next, the data processing section 5 starts a loop process for the number of the first documents set in the list L1 (S2). The data processing section 5 acquires one first document from the list L1 and recursively traces the first relations set in the acquired first document (S3).

Then, the data processing section 5 acquires second documents by tracing the first relations and sets the acquired second documents in a list L2 (S4). According to the present embodiment, a second document is a schematic functional design document, a detailed functional design document, or a source code. The data processing section 5 traces the first relations and sets the second documents in the list L2. The list L2 may be stored in the RAM 22.

According to the present embodiment, a first relation is set between a schematic functional design document and one or more detailed functional design documents. For all of schematic functional design documents in the list L2, the data processing section 5 acquires detailed functional design documents to which first relations are set. The data processing section 5 sets the acquired detailed functional design documents in the list L2.

According to the present embodiment, a first relation is set between a detailed functional design document and one or more source codes. For all of detailed functional design documents in the list L2, the data processing section 5 acquires source codes to which first relations are set. The data processing section 5 sets the acquired source codes in the list L2.

As described above, starting from a first document acquired from the list L1, the data processing section 5 sets all of second documents, to which first relations are set, in the list L2. According to the present embodiment, functional requirement documents are set in the list L1. Furthermore, any or all of schematic functional design documents, detailed functional design documents, and source codes are set in the list L2.

Next, the data processing section 5 starts a loop process for the number of the second documents set in the list L2 (S5). A second relation is set between a schematic functional design document and a system test specification document. A second relation is also set between a detailed functional design document and a unit test specification document. A second relation is further set between a source code and a program test specification document.

The data processing section 5 acquires one second document set in the list L2. Then, the data processing section 5 acquires the test items included in the test specification document by tracing the second relations set in the second document (S6). According to the present embodiment, the data processing section 5 acquires all of the test items included in each system test specification document, each unit test specification document, and each program test specification document.

The data processing section 5 determines whether or not any test items are included in the test specification document to which a second relation is set in the second document (S7). If no test item is included in the test specification document ("NO" in S7), S8 and S9 are not performed.

If any test items are included in the test specification document ("YES" in S7), the data processing section 5 acquires the number of the test items and the number of failures (S8). Each system test specification document, each unit test specification document, and each program test specification document is associated with a corresponding test result.

A test result includes the number of test items and the number of failures, that is, the number of test items included in a test specification document and the number of failures generated in the tests for the test items.

The arithmetic section 6 accumulates the number of test items and the number of failures of the test results related to the second document for each requirement (S9). According to the present embodiment, the arithmetic section 6 accumulates the number of test items and the number of failures for each requirement in each functional requirement document. An initial value of the number of test items and number of failures is zero.

If S6 to S9 are completed for the second document currently acquired from the list L2, the data processing section 5 and the arithmetic section 6 start S6 to S9 for the next second document set in the list L2 (S10).

Therefore, the arithmetic section 6 sequentially accumulates the number of test items and the number of failures for all of the second documents that are set in the list L2 and include any test items. Thus, a total number of test items and a total number of failures are acquired for all second documents related in first relations to a first document. That is, the total number of test items and the total number of failures are acquired for one requirement. The arithmetic section 6 performs the calculation of the degree of difficulty by dividing the total number of failures by the total number of test items (S11).

If the ratio of the total number of failures with respect to the total number of test items is high, the failure with respect to the requirement is high. Therefore, the degree of difficulty in realizing the requirement is increased. In contrast, if the ratio of the total number of failures with respect to the total number of test items is low, the failure with respect to the requirement is low. Therefore, the degree of difficulty in realizing the requirement is decreased.

S3 to S11 are processes for one requirement. In S3, the data processing section 5 acquires one first document. If any other first documents exist in the list L1, the data processing section 5 and the arithmetic section 6 perform S3 to S11 for one of the other first documents.

Therefore, the arithmetic section 6 may calculate the degree of difficulty for all of the first documents by performing S3 to S11 for all of the first documents set in the list L1.

When completing S3 to S11 for all of the first documents set in the list L1, the loop of S2 to S12 is completed.

The arithmetic section 6 calculates the degree of difficulty for each first document, that is, for each requirement by performing the above processes. Therefore, it is possible to evaluate, by using a quantitative numerical value, the degree of difficulty in realizing the requirement of the first document in which an abstract concept is defined.

FIG. 6 illustrates an example of a table quantitatively representing the degree of difficulty of each requirement. In FIG. 6, the degree of difficulty is represented by numerical values for two requirements (requirement_A and requirement_B). Thus, the first documents set in the list L1 in S1 in FIG. 5 is the documents for the requirement_A and the requirement_B.

A function_1, a function_2, a function_3, and a function_5 are examples of the functions defined in the second document. According to FIG. 6, a first relation is set between the requirement_A and three functions (function_1, function_3, and function_5). Furthermore, a first relation is set between the requirement_B and three functions (function_1, function_2, and function_5).

Therefore, the data processing section 5 obtains the number of test items and the number of failures from the test results of the function_1, the function_3, and the function_5 by recursively tracing the first relations for the requirement_A. According to FIG. 6, the number of test items is "20" and the number of failures is "2" for the function_1. The number of test items is "35" and the number of failures is "10" for the function_3. The number of test items is "48" and the number of failures is "3" for the function_5.

Figure 5:
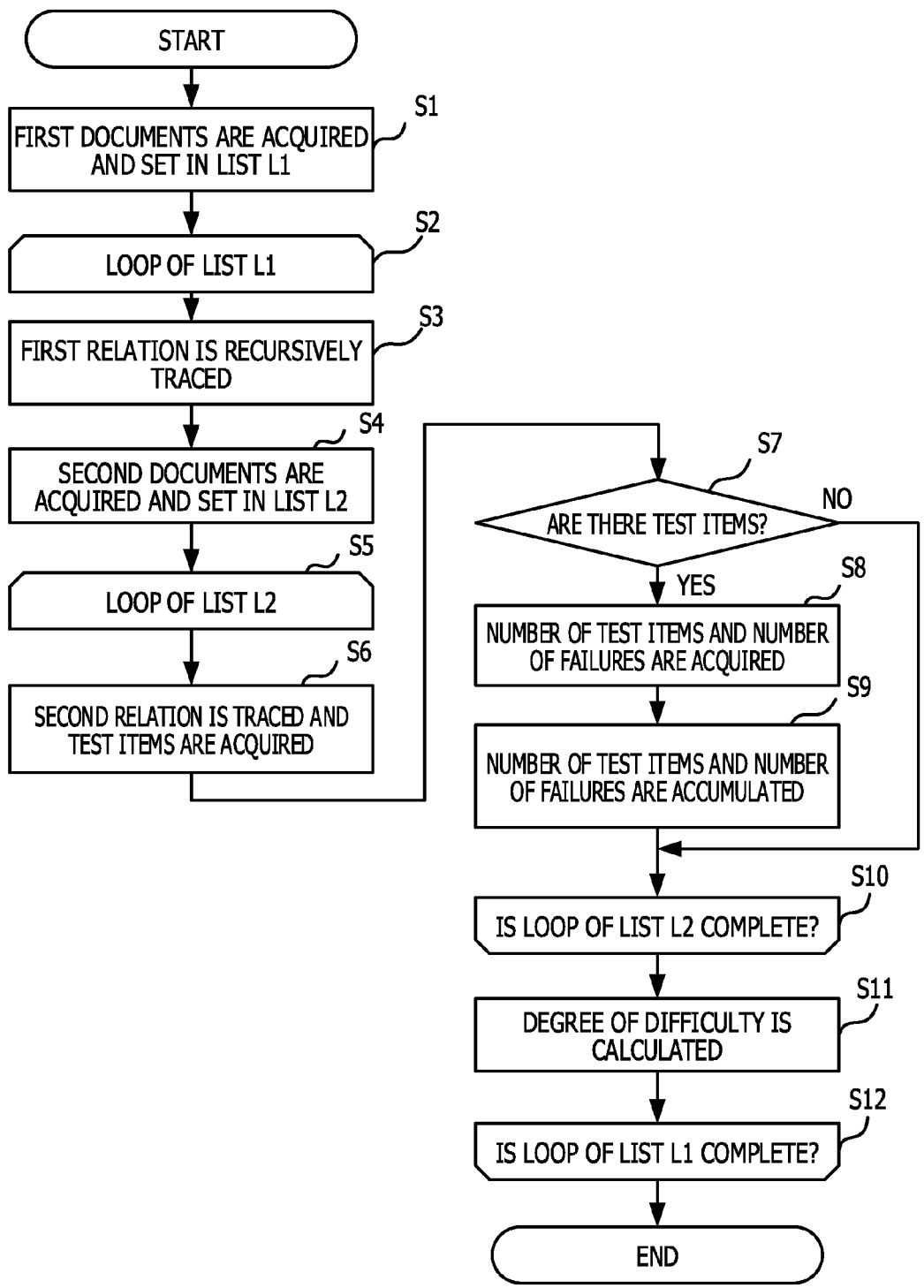
FIG. 5 is a flowchart illustrating an example of a process according to an embodiment.

As represented by the flow in FIG. 5, the arithmetic section 6 accumulates the number of test items and the number of the failures, respectively. Therefore, the total number of test items and the total number of failures for the function_1, the function_3, and the function_5 which realize the requirement_A are obtained. In FIG. 6, the total number of test items for the requirement_A is "103 (=20+35+48)".

On the other hand, the total number of failures is "15 (=2+10+3)". The arithmetic section 6 divides the total number of failures by the total number of test items for the requirement_A. Therefore, the arithmetic section 6 obtains a numerical value of "0.1456 . . . (=15/103)≅0.146". Hereinafter, each numerical value is rounded off to three decimal places.

As described in the flow of FIG. 5, the calculation of the degree of difficulty is separately performed for the requirement_A and the requirement_B. The data processing section 5 obtains the number of test items and the number of failures from the test results of the function_1, the function_2, and the function_5 by recursively tracing the first relations for the requirement_B. According to FIG. 6, the function_1 and the function_5 have the values described above. The number of test items is "40" and the number of failures is "4" for the function_2.

In FIG. 6, the total number of test items for the requirement_B is "108 (=20+40+48)". On the other hand, the total number of failures is "9 (=2+4+3)". Thus, the arithmetic section 6 obtains "0.0833 . . . (=9/108)≅0.083" by dividing the total number of failures by the total number of test items for the requirement_B.

The degree of difficulty of "0.146" in realizing the requirement_A and the degree of difficulty of "0.083" in realizing the requirement_B are quantitative numerical values. It is difficult to realize the requirement if the numerical value of the degree of difficulty is increased whereas it is easy to realize the requirement if the numerical value of the degree of difficulty is decreased. Therefore, the screen generation section 7 outputs a screen such as illustrated in FIG. 6 to the display unit 2.

Thus, a person (hereinafter, referred to as a designer) viewing the display unit 2 may quantitatively evaluate the degree of difficulty of each requirement. The designer may evaluate whether or not the requirement is to be realized on the basis of the degree of difficulty that is quantitatively displayed. Thus, it is possible to support the design of the product.

The screen example of FIG. 6 has a column for "necessity". As described above, there is a difference in the level of necessity for realization of requirements of the product. For example, there is a difference in the respective levels of the necessity for realization of requirements, such as requirements mandatory to the product, requirements for improving commodity power, and requirements of a convenient function described above.

Thus, the necessity of each requirement is quantified and stored in the necessity storage section 4. The necessity storage section 4 stores the necessity quantified for each requirement. The value of the necessity indicates to what degree the requirement is necessary for the product to be developed. For example, the value of the necessity may be determined on the basis of the statistics of the necessity for a requirement. In FIG. 6, the necessity of the requirement_A is "0.15" and the necessity of the requirement_B is "0.05". Therefore, the necessity of the requirement_A is higher than that of the requirement_B.

Displaying the degree of difficulty of each requirement in the display unit 2 allows the designer to quantitatively recognize the degree of difficulty. At this time, it is preferable that the degree of difficulty and the necessity may be compared with each other. Thus, the designer may evaluate whether or not a requirement is to be realized in the product on the basis of the degree of difficulty with respect to the necessity.

In FIG. 6, the degree of difficulty is "0.146" and the necessity is "0.15" for the requirement_A. Therefore, the designer may recognize that the requirement_A has a degree of difficulty commensurate with the necessity. On the other hand, the degree of difficulty is "0.083" and the necessity is "0.05" for the requirement_B, in FIG. 6. Therefore, the designer may recognize that the requirement_B has a high degree of difficulty with respect to the necessity.

In FIG. 6, other numerical values are indicated in the column for "degree of difficulty". The numerical values are values obtained by dividing the degree of difficulty by the necessity. That is, the numerical values indicate the ratio of the degree of difficulty with respect to the necessity. The value is "0.9708 . . . (=(15/103)/0.15)≅0.971" for the requirement_A, and the value is "1.6666 . . . (=(9/108)/0.05)≅1.667" for the requirement_B.

In FIG. 6, the ratio of the degree of difficulty with respect to the necessity is illustrated. For example, the numerical value for the requirement_A is "0.971" which is less than "1". Thus, the designer may recognize the degree of difficulty is commensurate with the necessity by viewing the numerical value in the parentheses.

On the other hand, the numerical value for the requirement_B is "1.667" which is relatively high with respect to "1". The designer may recognize that the degree of difficulty is relatively higher than the necessity by viewing the numerical value in the parentheses. That is, the designer may recognize a relation between the degree of difficulty and the necessity, on the basis of one numerical value in the parentheses.

Figure 7:
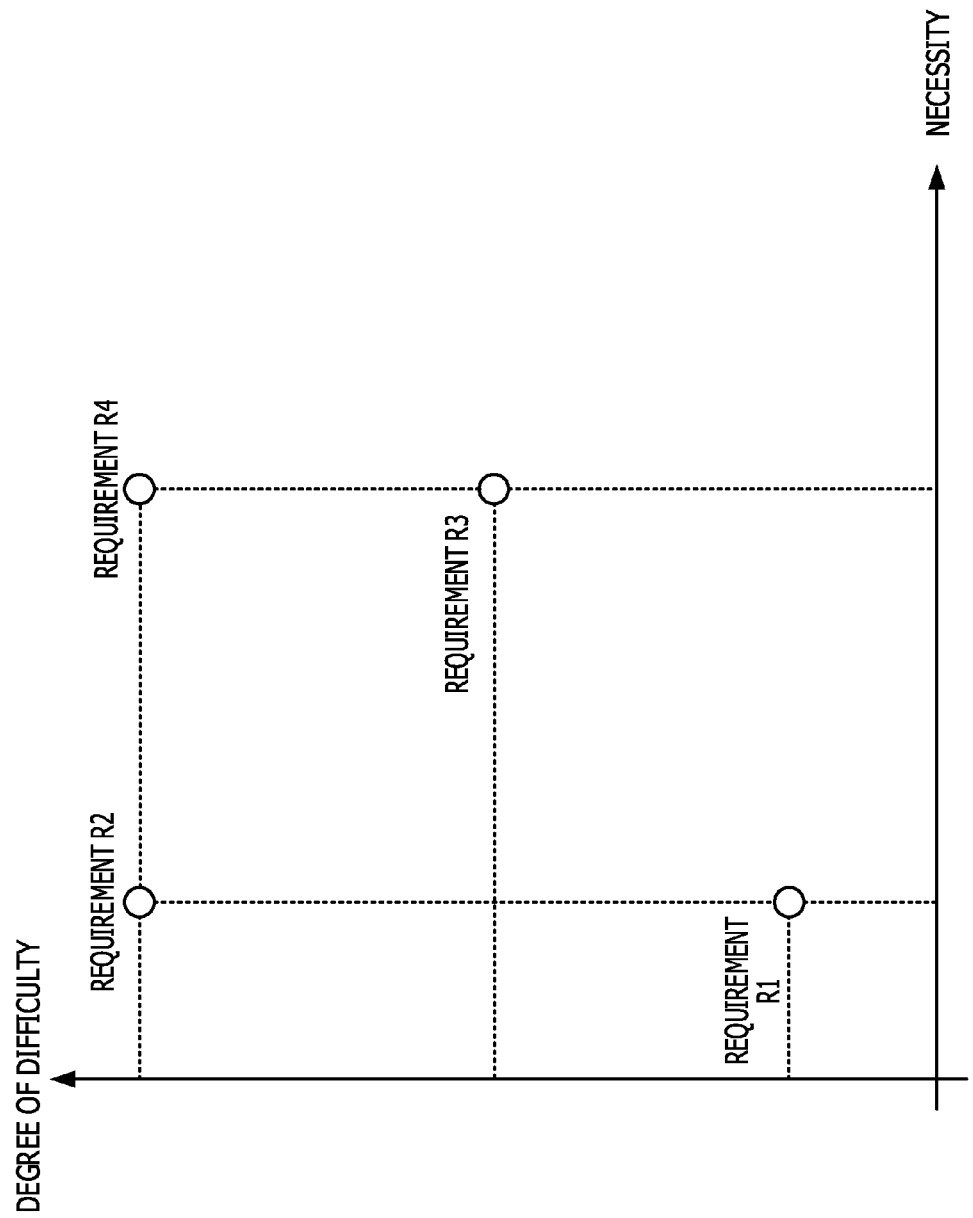
FIG. 7 is an example of a graph illustrating a degree of difficulty of each requirement according to an embodiment.

FIG. 7 illustrates an example of a screen in which the degrees of difficulty are represented in graph form. As described above, a degree of difficulty is obtained for each requirement as a quantitative numerical value. Therefore, the screen generation section 7 may display the degrees of difficulty in graph form. In FIG. 7, a horizontal axis indicates the necessity and a vertical axis indicates the degree of difficulty, and the degrees of difficulty of a requirement R1 to a requirement R4 are represented. The necessity is low and the degree of difficulty is also low for the requirement R1. Therefore, the designer may recognize that the requirement R1 has a degree of difficulty commensurate with the necessity if the requirement R1 is realized in the product to be developed.

On the other hand, the necessity is low and the degree of difficulty is very high for the requirement R2. Therefore, the designer may recognize that the requirement R2 has a degree of difficulty which is not commensurate with necessity. Thus, the designer may obtain a clue for considering omitting the requirement R2 from the product to be developed.

The necessity is high and the degree of difficulty is also high for the requirement R3. Therefore, the designer may recognize that the requirement R3 has a degree of difficulty commensurate with the necessity if the requirement R3 is realized in the product to be developed.

On the other hand, the necessity is high and the degree of difficulty is very high for the requirement R4. Therefore, the designer may recognize that the requirement R4 has a high degree of difficulty with respect to the necessity. Here, the requirement having a high necessity is likely to be a requirement that is desired to be realized in the product to be developed. For example, the requirements mandatory to the product are desired to be realized regardless of the degree of difficulty.

Thus, the designer may determine that the requirement R4 is to be realized in the product to be developed even if the requirement R4 has a degree of difficulty not commensurate with the necessity because the necessity for the requirement R4 is high.

As in FIG. 7, the screen generation section 7 generates a screen representing a graph and displays the graph in the display unit 2, on the basis of a degree of difficulty that is obtained as a quantitative numerical value. Thus, the designer may visually recognize the degree of difficulty of each requirement. In addition, depending on the necessity, the designer may determine to realize a requirement in the product to be developed regardless of the degree of difficulty.

Second Embodiment

Figure 8:
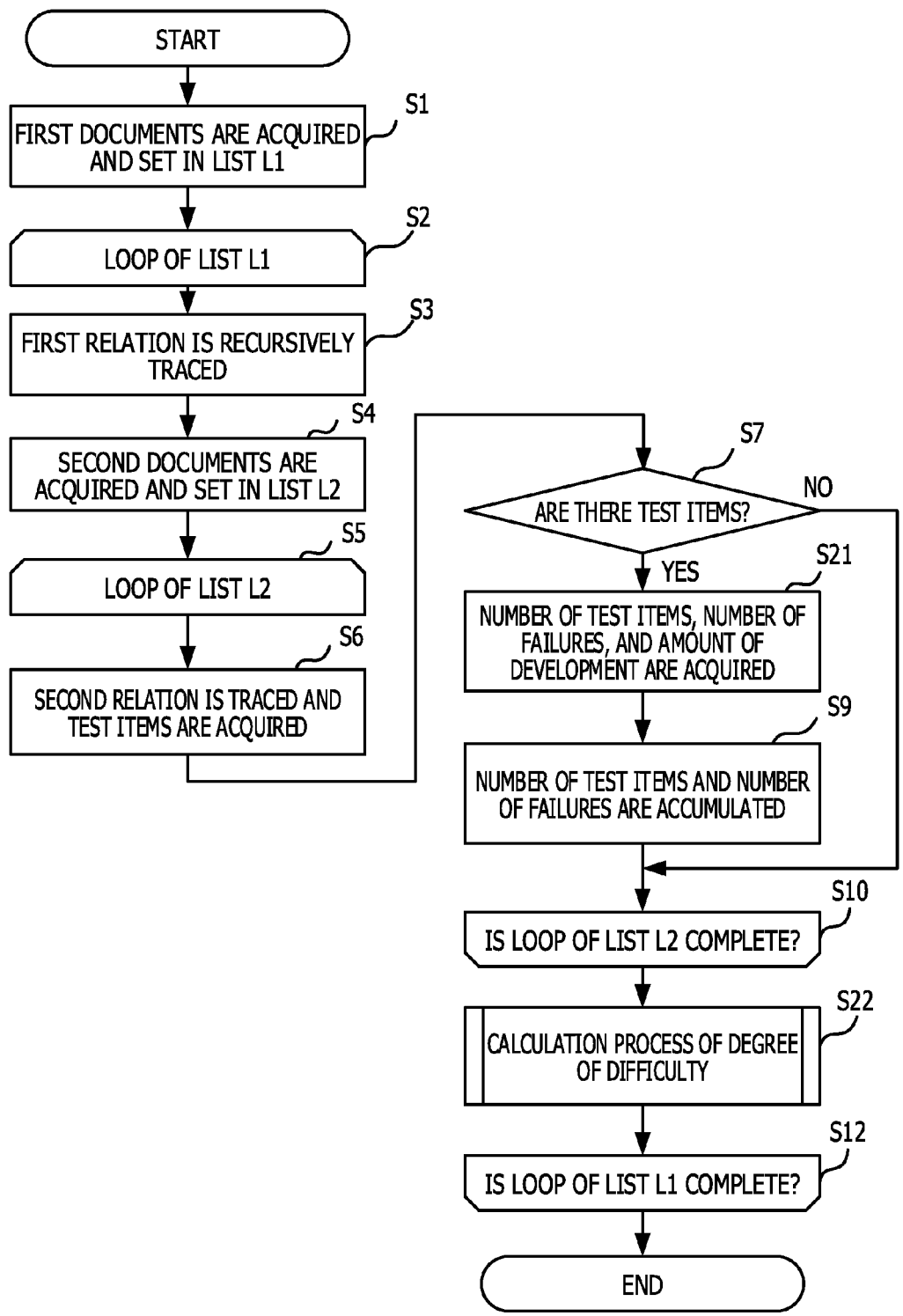
FIG. 8 is a flowchart illustrating an example of a process according to an embodiment.

Next, a second embodiment will be described. In the second embodiment, the arithmetic section 6 performs the calculation of the degree of difficulty taking into account an amount of development. FIG. 8 represents a flow of a process according to the present embodiment. In the flow of FIGS. 8, S8 and S11 in FIG. 5 are respectively changed to S21 and S22. The others are the same as those in the flow of FIG. 5.

The amount of development is a workload for realizing the function of a second document. As an example, it is assumed that the amount of development is a total number of steps of the source code. If the second document is a schematic functional design document or a detailed functional design document, a total number of steps of one or more source codes to which first relations are set starting from the design document is the amount of development.

Similar to S8 of FIG. 5, the data processing section 5 acquires the number of test items and the number of the failures. If the test specification document including the test items is a program test specification document, the data processing section 5 acquires the total number of the steps of the source code in which the second relation is set to the program test specification document (S21).

If the test specification document including the test items is a schematic functional design document or a detailed functional design document, the data processing section 5 acquires one or more source codes by tracing the first relations. The data processing section 5 acquires the total number of the steps of the acquired one or more source codes.

Figure 9:
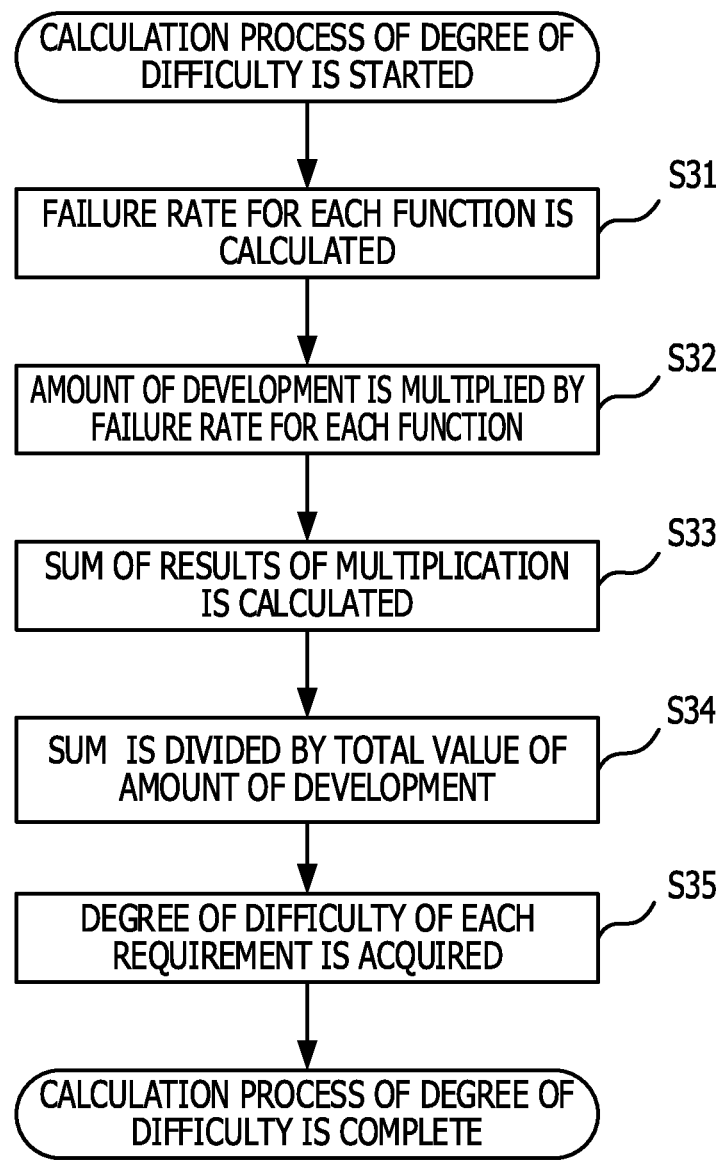
FIG. 9 is a flowchart illustrating an example of an arithmetic process of a degree of difficulty of each requirement.

When completing the loop process of S5 to S10, the calculation process of the degree of difficulty is performed for each requirement (S22). FIG. 9 illustrates an example of the calculation process performed in S22. FIG. 10 illustrates an example of a table of the degree of difficulty of each requirement. In the table of FIG. 10, a column for "amount of development" is added to the table of FIG. 6.

As illustrated in the flowchart of FIG. 9, the arithmetic section 6 calculates a failure rate for each of the functions (S31). The arithmetic section 6 calculates the failure rates of the function_1, the function_2, the function_3, and the function_5 included in the requirement_A and the requirement_B. According to the present embodiment, the failure rate is a value obtained by dividing the number of failures by the number of test items.

Therefore, the failure rate for the function_1 is "0.1 (=2/20)". The failure rate for the function_2 is "0.1 (=4/40)". The failure rate for the function_3 is "0.2857 . . . (=10/35)≅0.286". The failure rate for the function_5 is "0.0625 (=3/48)≅0.063".

The function_1 and the function_5 are overlapping in the requirement_A and the requirement_B. In this case, the function_1 and the function_5 may be calculated for each requirement, but the overlapping calculation is performed. Therefore, when the failure rates for the function_1 and the function_5 are calculated for the requirement_A, those failure rates may not be calculated for the requirement_B but a result of the calculation for the requirement_A may be used instead.

Next, the arithmetic section 6 multiplies the amount of development by the failure rate for each function (S32). In FIG. 10, the amount of development for each function is indicated in Kstep. The amount of development for the function_1 is "1", the amount of development for the function_2 is "1.8", the amount of development for the function_3 is "1.5", and the amount of development for the function_5 is "2".

A value that is obtained by multiplying the amount of development by the failure rate for the function_1 is "0.1 (=0.1×1)". A value that is obtained by multiplying the amount of development by the failure rate for the function_2 is "0.18 (=0.1×1.8)". A value that is obtained by multiplying the amount of development by the failure rate for the function_3 is "0.4285 . . . (=(10/35)×1.5≅0.429)". A value that is obtained by multiplying the amount of development by the failure rate for the function_5 is "0.125 (=(3/48)×2)".

Next, the arithmetic section 6 sums up the values obtained by multiplying the amount of development by the failure rate for each function (S33). A first relation is set between the requirement_A and each of the function_1, the function_3, and the function_5. The arithmetic section 6 sums up the values (the values that are obtained by multiplying the amount of development by the failure rate) obtained for the function_1, the function_3, and the function_5.

Therefore, the arithmetic section 6 performs the calculation of "0.1+0.429+0.125" and obtains a sum of "0.654". The sum is a value obtained by summing up the values obtained by multiplying the amount of development by the failure rates for the requirement_A. The arithmetic section 6 also performs the summing up for the requirement_B. The arithmetic section 6 performs the calculation of "0.1+0.18+0.125" and obtains a sum of "0.405". The sum is a value that is obtained by summing up the values obtained by multiplying the amount of development by the failure rates for the requirement_B.

Next, the arithmetic section 6 divides the sum by the total amount of development (S34). The total amount of development for the requirement_A is "4.5 (=1+1.5+2)". Thus, the arithmetic section 6 obtains a value of "0.145" by performing the calculation of "0.654/4.5" for the requirement_A.

The total amount of development for the requirement_B is "4.8 (=1+1.8+2)". Thus, the arithmetic section 6 obtains a value of "0.084" by performing the calculation of "0.405/4.8" for the requirement_B.

A value obtained by the arithmetic section 6 in S34 is a degree of difficulty of each requirement. Thus, the arithmetic section 6 obtains the degree of difficulty of "0.145" for the requirement_A and the degree of difficulty of "0.084" for the requirement_B (S35).

As illustrated in the flow of FIG. 5, a quantitative degree of difficulty of a requirement may be obtained from the number of test items and the number of the failures. In the present embodiment, the arithmetic section 6 performs the calculation of a quantitative degree of difficulty of a requirement with consideration for a factor of the amount of development in addition to the number of test items and the number of the failures. Thus, it is possible to obtain a degree of difficulty of a requirement in further detail.

FIG. 6 illustrates an example of the degree of difficulty calculated on the basis of the number of test items and the number of the failures. As illustrated in FIG. 6, the degree of difficulty of the requirement_A is "0.146". On the other hand, the degree of difficulty illustrated in FIG. 10 is "0.145". This degree of difficulty is a value obtained by the calculation based on the number of test items, the number of the failures, and the amount of development. Thus, both values are different from each other.

As illustrated in FIG. 6, the degree of difficulty of the requirement_B is "0.083". On the other hand, the degree of difficulty illustrated in FIG. 10 is "0.084". Also for the requirement_B, the calculated values are different from each other depending on whether or not the amount of development is taken into account in the calculation of the degree of difficulty. Thus, it is possible to output a degree of difficulty of a requirement in further detail by performing the calculation taking into account the amount of development.

Also in the present embodiment, the display unit 2 may display the relation between the degree of difficulty and the necessity in graph form as illustrated in FIG. 7 in addition to displaying the degree of difficulty and the necessity in the table as illustrated in FIG. 10. Thus, the designer may recognize the relation between the degree of difficulty and the necessity taking into account the amount of development.

In the first embodiment and the second embodiment, the calculation methods of the arithmetic section 6 are different from each other. However, it is the same at the point that the degree of difficulty of the requirement is calculated on the basis of the number of the test items, which are included in the test documents for all of the second documents related to the first document, and the test results of the test items. Thus, the designer may quantitatively recognize the degree of difficulty in realizing the requirement.

In the first embodiment and the second embodiment, the difficulty degree calculation unit 1 may refer to each piece of document data of the database 3. Thus, the difficulty degree calculation unit 1 may obtain each piece of document data from the database 3 and refer to the acquired document data or may search for the contents of each piece of document data stored in the database 3.

In the first embodiment and the second embodiment, the arithmetic section 6 calculates the degree of difficulty of the requirement by using the number of failures in the test results, but may perform the calculation of the degree of difficulty of the requirement by using the number of normalcies in the test results. Since a total of the number of the normalcies and the number of failures is the number of test items, the arithmetic section 6 may calculate the degree of difficulty of the requirement by using the number of normalcies.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
   acquiring a first document and second documents related to the first document, the first document defining a first requirement, the second documents defining functions of the first requirement;
   acquiring test documents related to the respective second documents and test results associated with the respective test documents, the respective test documents each comprising a plurality of test items, the test results being results of tests according to the test items and include numbers of normalcies and failures; and
   calculating, based on the test results and a total number of the test items included in the test documents, a degree of difficulty in realizing the first requirement, wherein the calculating includes:
      calculating, for each of the second documents, a failure rate by dividing a first number of failures in a first test result associated with a first test document related to each of the second documents by a second number of test items included in the first test document,
      multiplying, for each of the second documents, a third number of steps in a first source code for realizing functions defined in each of the second documents by the failure rate,
      summing up values obtained by the multiplying for all of the second documents to obtain a first sum, and
      calculating the degree of difficulty by dividing the first sum by a total number of steps in all of source codes for realizing the first requirement.

2. The non-transitory computer-readable recording medium according to claim 1, the process further comprising:
   acquiring other documents defining other requirements; and
   calculating a degree of difficulty in realizing each of the other requirements.

3. The non-transitory computer-readable recording medium according to claim 1, wherein
   the second documents include first design documents in which the first requirement is refined or substantiated, second design documents in which each of the first design documents is refined or substantiated, and source codes in which each of the second design documents is refined or substantiated.

4. The non-transitory computer-readable recording medium according to claim 1, the process further comprising:
displaying a necessity of the first requirement together with the degree of difficulty.

5. The non-transitory computer-readable recording medium according to claim 4, the process further comprising:
displaying a value obtained by dividing the degree of difficulty by the necessity.

6. The non-transitory computer-readable recording medium according to claim 4, wherein
a relation between the degree of difficulty and the necessity is displayed in graph form.

7. The non-transitory computer-readable recording medium according to claim 1, wherein
the degree of difficulty is calculated on basis of the total number, the test results, and an amount of development for realizing functions defined in each of the second documents.

8. A method for supporting product design, the method comprising:
acquiring, by a computer, a first document, second documents related to the first document, test documents related to the respective second documents, and test results associated with the respective test documents, the first document defining a first requirement, the second documents defining functions of the first requirement, the respective test documents each comprising a plurality of test items, the test results being results of tests according to the test items and include numbers of normalcies and failures; and
calculating, based on the test results and a total number of the test items included in the test documents, a degree of difficulty in realizing the first requirement, wherein the calculating includes:
calculating, for each of the second documents, a failure rate by dividing a first number of failures in a first test result associated with a first test document related to each of the second documents by a second number of test items included in the first test document,
multiplying, for each of the second documents, a third number of steps in a first source code for realizing functions defined in each of the second documents by the failure rate,
summing UP values obtained by the multiplying for all of the second documents to obtain a first sum, and
calculating the degree of difficulty by dividing the first sum by a total number of steps in all of source codes for realizing the first requirement.

9. A product design support apparatus, comprising:
a storage unit configured to
store therein a first document, second documents related to the first document, test documents related to the respective second documents, and test results associated with the respective test documents, the first document defining a first requirement, the second documents defining functions of the first requirement, the respective test documents each comprising a plurality of test items, the test results being results of tests according to the test items and include numbers of normalcies and failures; and
a processor configured to
acquire the first document, the second documents, the test documents, and the test results stored in the storage unit, and
calculate, based on the test results and a total number of the test items included in the test documents, a degree of difficulty in realizing the first requirement, wherein the calculate the degree of difficulty includes:
calculating, for each of the second documents, a failure rate by dividing a first number of failures in a first test result associated with a first test document related to each of the second documents by a second number of test items included in the first test document,
multiplying, for each of the second documents, a third number of steps in a first source code for realizing functions defined in each of the second documents by the failure rate,
summing up values obtained by the multiplying for all of the second documents to obtain a first sum, and
calculating the degree of difficulty by dividing the first sum by a total number of steps in all of source codes for realizing the first requirement.

* * * * *